April 19, 1966   J. E. TURNER   3,246,923
AIR CURRENT DEFLECTOR FOR A CONVERTIBLE TYPE VEHICLE
Filed Sept. 18, 1964   2 Sheets-Sheet 1

INVENTOR.
John E. Turner
BY Manfred M. Warren
His Attorney

April 19, 1966     J. E. TURNER     3,246,923
AIR CURRENT DEFLECTOR FOR A CONVERTIBLE TYPE VEHICLE
Filed Sept. 18, 1964     2 Sheets-Sheet 2

INVENTOR.
John E. Turner
BY
His. Attorney

United States Patent Office 3,246,923
Patented Apr. 19, 1966

3,246,923
AIR CURRENT DEFLECTOR FOR A CONVERTIBLE TYPE VEHICLE
John E. Turner, 57 Canyon Drive, Port Costa, Calif.
Filed Sept. 18, 1964, Ser. No. 397,495
9 Claims. (Cl. 296—1)

The invention relates to air current deflectors and more particularly to accessories for protecting occupants of open top vehicles from high velocity air currents entering from the top, side and rear. The present application is a continuation-in-part of my co-pending application Serial No. 333,352, filed Dec. 26, 1963, for Convertible Type Vehicle Air Current Deflector, now abandoned.

An object of the present invention is to provide a device which makes possible increased occupant comfort within a convertible type vehicle when the top is in a retracted position through increased climate control by means of the vehicle heater or mechanical refrigeration unit, and it gives safe protection in a simple and efficient manner from high velocity air currents that enter from the top, side and rear of the vehicle without completely eliminating the entry of fresh air.

Another object of the present invention is to provide an air current deflector that is attractive in apearance, does not restrict vision, can remain safely in place with the top either up or down, does not hamper entry to the rear seat of the vehicle even in two-door convertibles, is easily attached and removed, and can be inexpensively manufactured and assembled from a comparatively few inexpensive parts.

A further object of the present invention is to provide a deflector which results in several unique acoustical features, including reduction of wind noise generated by the vehicle, increased pleasure in listening to a vehicle radio, and improved acoustics for conversation between occupants of adjoining seats.

A still further object of the present invention is to provide increased occupant protection from over-exposure to sun rays and to partially reflect sun rays to provide cooler temperatures beneath the deflector.

The invention possesses other objects and features of advantage, some of which of the foregoing will be set forth in the following description of the preferred form of the invention which is illustrated in the drawings accompanying and forming part of this specification. It is to be understood however, that variations in the showing made by the said drawings and description may be adopted within the scope of the invention as set forth in the claims.

Referring to said drawings (two sheets):

Figures 1, 2:
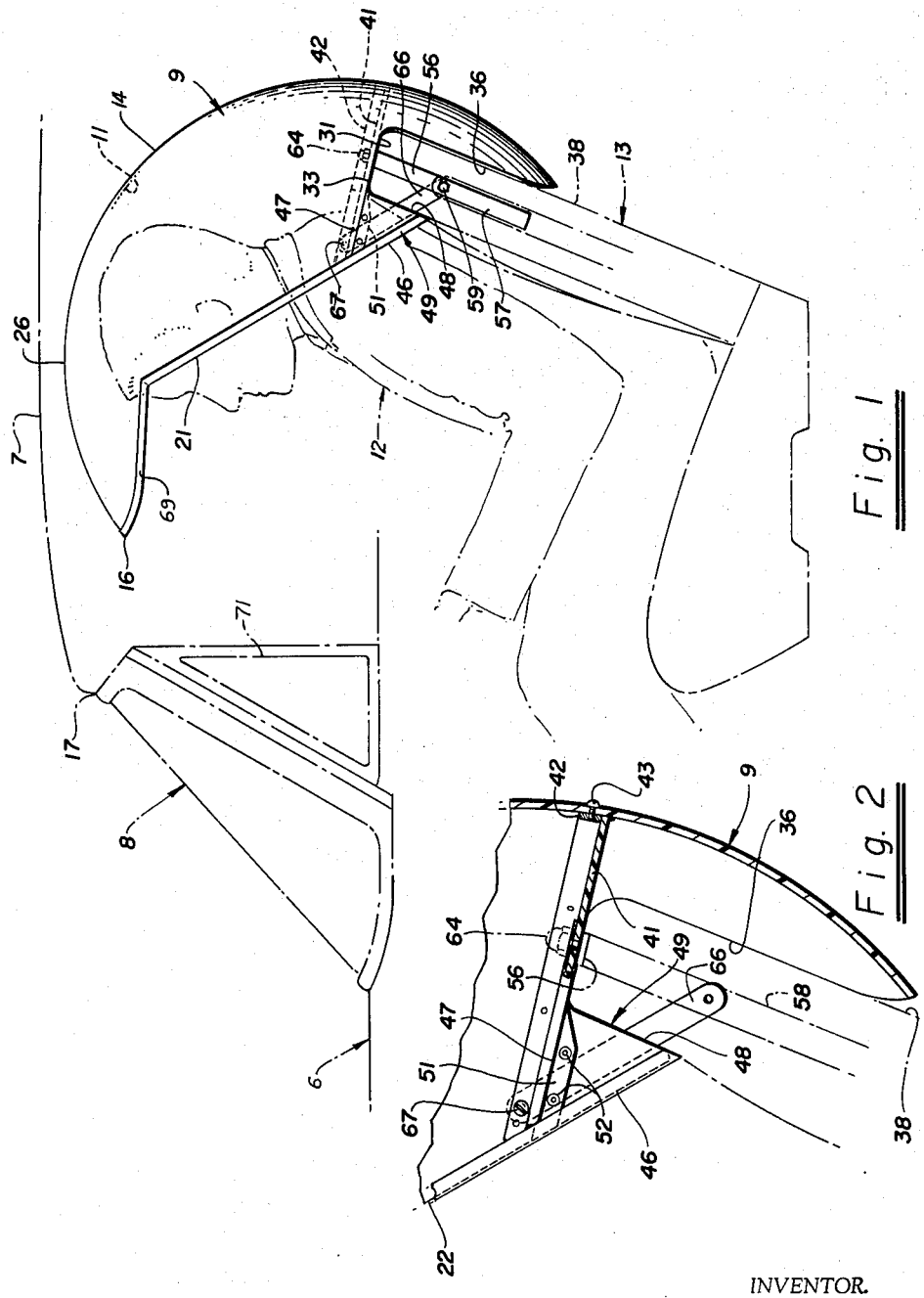
FIGURE 1 is a side view of the air current deflector embodying the features of the present invention with portions of the windshield, roof, seat, and occupant of the seat in phantom.
FIGURE 2 is a partial side view of a portion of the air current deflector with a portion shown in cross-section and a portion of the seat shown in phantom and drawn to an enlarged scale.
Figure 4:
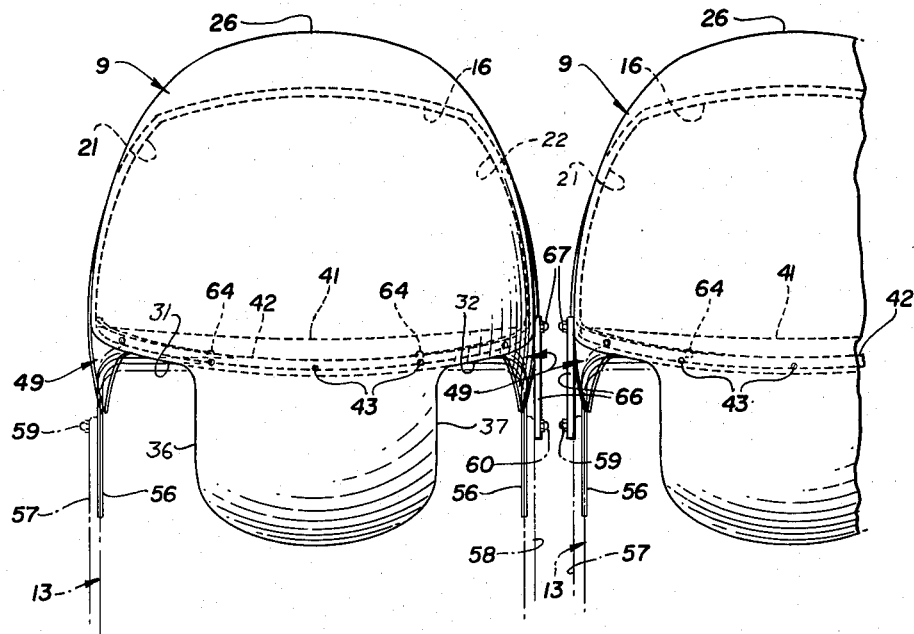
FIGURE 4 is a rear elevation view of a current deflector and portions of an adjacent air deflector with both mounted on seats shown in phantom.
Figure 3:
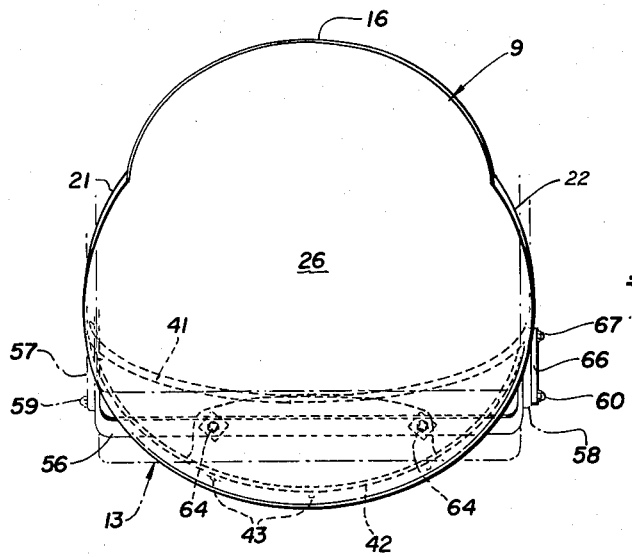
FIGURE 3 is a top plane view of the air current deflector with portions of the seat shown in phantom.

The air current deflector of the present invention is specifically designed for use with a vehicle 6 having a retractable roof 7 and a windshield 8 and is briefly comprised of a transparent shell 9 adapted for attachment to a vehicle and having a concave surface 11 for partially enveloping portions of the head and shoulders of an occupant 12 of a seat 13 located adjacent windshield 8, and having a convex surface 14 for deflecting substantially all rapidly moving air currents approaching the head and shoulders of the occupant from the top, side and rear.

The air deflector of the present invention may be attached to the floor or sides of a convertible type vehicle, but I have found that the deflector is particularly well adapted for mounting on the back of a passenger seat for forming a relatively air tight seal therewith.

Referring in greater particular to the shell 9, the material may be a clear vinyl, glass or other transparent material, but I have found that Plexiglas which may be pressure formed and when heat annealed is high in strength and is optically clear to meet necessary visual safety requirements. The deflector may be formed from a hemisphere and for most standard sized automobiles a 28-inch diameter is properly proportioned and gives ample room for most persons. As an added feature, I have found that Plexiglas filters and deflects ultra-violet rays giving added protection from sunburn and heat. After standing in the sunlight for a period of time, the temperature beneath the shell is actually a few degrees cooler than the temperature at an unprotected spot in the automobile.

The shell 9 is placed as shown in FIGURE 1 so that the front leading edge 16 is spaced from the windshield 8 and is approximately the same height as the top edge 17 of the windshield. The distance of the leading edge 16 above or below the top of the windshield will vary with the rake or slant of the windshield. A windshield having a very slight rake will tend to deflect air upwardly and will permit the leading edge 16 to be raised accordingly. In like manner, where the rake of the windshield is very great, air currents passing over the car will not be forced upwardly nearly as far and the leading edge 16 will have to be lowered in relation to the top edge 17 of the windshield. The leading edge 16 extends forwardly from the head of the occupant and is at a somewhat lower elevation than the topmost part of the shell. Portions of the hemisphere may be cut away as shown in FIGURE 1 so that the face of the occupant will extend forwardly of edges 21 and 22 so that normal conversation may be carried on between occupants of adjacent seats.

Another important feature of the present invention is the fact that the shell is so designed as to remain safely in place with the top either up or down and is designed so as not to hamper entry to the rear seat of the vehicle even in two-door convertibles, and may be easily attached and removed. As shown in FIGURE 1, the topmost part of the shell designated as point 26 falls below a phantom roof line 7 so that the top may be raised or lowered without removing the shell. Furthermore, by mounting the shell on the back 13 of a seat and disposing the leading edge 16 rearwardly of windshield 8, the back of seat 13 may be pivoted forwardly to permit entry of passengers to the rear seat and shell 9 will not be restricted by either the roof 7 or the windshield 8 when it is pivoted forwardly.

The main feature of the present invention as noted in the outset of this application is the fact that high velocity air currents entering from the top, rear and sides are prevented from striking the head and shoulders of the occupant of the seat. The convex outer surface of the hemispherical shell causes air currents to be deflected and due to the absence of any flat surfaces only a very slight air pressure is exerted upon the shell permitting light mounting means to be used in attaching the shell to the seat. In like manner, the inside concave curvilinear surface presents no flat surfaces and any air currents which enter the shell merely pass around the smooth surface and out the other side.

An added feature of the present invention resulting from the hemispherical shape is the formation of an acoustical shell which forms a receptacle for receiving the sound waves from the vehicle radio and thus increases the occupants' listening pleasure. Furthermore, not only does the shell deflect high velocity air currents, but substantially reduces the noise generated by such air currents and thus automobile radios which are difficult to hear at high speeds may be listened to with considerable pleasure.

The structure of the hemispherical shell may be utilized in attaching the shell to the back of the vehicle seat. Portions of the hemisphere may be removed so that edges 31 and 32 rest on the top portion 33 of seat back 13 for carrying the vertical load of the shell. Edges 36 and 37 grip the back surface 38 of the seat for resisting lateral forces exerted forwardly on the shell 9.

Although the pressures exerted on the shell are slight, I have found that at extremely high speeds there is a tendency for shells formed in a perfect hemisphere to deflect. I have solved this problem by placing the shell under a slight stress by drawing edges 21 and 22 toward one another thus forming a smaller diameter curvilinear surface by attaching diametrically opposed portions of the hemisphere to a member 41 which has a length relatively less than the unstressed diameter of the shell. Member 41 may be of Plexiglas, aluminum, stainless steel or other material capable of tensile stresses and is here shown as a horizontal crescent shaped member attached to a curvilinear metal piece 42 by means of rivets (not shown) and adhesive such as epoxy, and the metal band 42 is in turn attached to the shell by means of fasteners such as screw 43 as shown in FIGURE 2.

Still a further advantage of the present invention as above set forth is the provision of greater climate control available to the occupant where the vehicle is equipped with heating and mechanical refrigeration units. I have found that even on very cool days the vehicle may be driven in comfort at freeway speeds with the top in the retracted position since the heat from the regular automobile heater circulates up and around the back of the neck and shoulders of the occupant and the cold high velocity air currents are deflected by the convex outer surface. Thus convertibles may become a practical reality in colder climates and even may be appreciated in the cooler hours of the day such as at night when the full advantages of a convertible may be enjoyed with the top retracted. If the vehicle is equipped with a refrigeration unit, cool air may be circulated around the shoulders and the back of the neck of the occupant to keep cool while driving on hot days.

Where the difference in temperature between the inside and the outside of the shell is great, I have found that it is important to maintain a substantial air tight seal at the back of the seat by means of member 41. I have even found that it is important to seal off such small areas as that bounded by edges 46, 47, and 48 of shell 9. This triangular shaped area may be Plexiglas and integrally attached to shell 9 or preferably it may be a small piece of pliable plastic so as to enable the shell to be attached to various seat backs 13 having variable thicknesses. This flap 49 may be fastened to a portion 51 of shell 9 extending below member 41, as by fasteners 52.

Shell 9 may be attached to the floor or sides of a vehicle by various means or in several different ways to a seat back 13. As shown here, a preferred form of attaching the shell is indicated particularly in FIGURES 1 and 2. A U-shaped strap 56 is attached to metal uprights 57 and 58 of seat back 13 by means of fasteners 59 and 60. Strap 56 is provided with upstanding threaded studs (not shown) which are received in holes drilled in the member 41 resting on seat back edge 33. Thus shell 9 may be securely fastened to seat back 13 by merely tightening two knurled nuts 64 or wing nuts on the studs.

To provide for additional bracing, brace member 66 may be attached to upright 58 by fastener 60 and extending forwardly and attached to shell 9 by fastener 57 at either side of the shell.

All edges of the shell 9 should of course be smoothed and rounded to prevent abrasion of the occupant and the seat 13 and as an added safety feature an edging 69 may be applied to portions of the shell so as to contain the pieces of the shell should the Plexiglas fracture to the edge. Edging 69 may consist of standard automobile edge trim which is normally made from a spring U-shaped metal covered by vinyl plastic.

The present invention fulfills a long sought need for extending the pleasure of riding in an open topped vehicle without the discomfort of high velocity winds striking the back of the head and shoulders of the occupant and thus a more comfortable and cleaner ride is possible. When an open topped vehicle is operated at normal or freeway speeds, air is deflected upwardly by windshield 8 which tends to re-enter the vehicle at varying distances behind the windshield due to the differences in pressure created by the windshield wherein the pressure above the windshield is greater than the pressure within the automobile. Thus air currents tend to curl back into the compartment of the vehicle and to strike the back of the head and shoulders of the occupant. These objectionable high velocity air currents are deflected by shell 9 of the present invention. In like manner, air currents are deflected around the side of the automobile and tend to strike the side of the person but where the present invention is used these side air currents strike the shell rearwardly of edge 21 and are deflected away from the occupant of the vehicle. The amount of air entering from the side may be controlled by the wings 71 of the automobile.

I claim:

1. An air current deflector for a normally rapidly moving open top vehicle having a windshield comprising, a transparent shell removably attached to said vehicle and having a concave inner surface for partially enveloping portions of the head and shoulders of an occupant of a seat located adjacent said windshield, said shell defining a forwardly facing opening thereby presenting an unobstructed view to said seated occupant and affording access to said seat, and said shell being positioned adjacent but spaced from said windshield and cooperating therewith and having a convex outer surface for deflecting substantially all rapidly moving air currents approaching the head and shoulders of the occupant from the top, side and rear which are normally deflected by said windshield and re-enter the seating area of said vehicle from behind said occupant.

2. An air current deflector for an open top vehicle having a windshield comprising, a transparent shell removably attached to the back of a passenger seat mounted adjacent said windshield and forming a relatively air tight seal with said seat, said shell defining a forwardly facing opening thereby presenting an unobstructed view to a seated occupant and affording access to said seat, said shell being positioned adjacent but spaced from said windshield and cooperating therewith and having a concave inner surface for partially enveloping portions of the head and shoulders of said occupant of said seat and a convex outer surface for deflecting substantially all rapidly moving air currents approaching the head and shoulders of the occupant from the top, side and rear which are normally deflected by said windshield and re-enter the seating area of said vehicle from behind said occupant.

3. An air current deflector for an open top vehicle having a windshield comprising, a transparent shell removably attached to the back of a forwardly facing automobile seat and having a concave inner surface for partially enveloping portions of the head and shoulders of an occupant of a seat located adjacent to said windshield, and having a convex outer surface for deflecting substantially all rapidly moving air currents approaching the head and shoulders of the occupant from the top, side and rear, and said shell having a leading edge spaced rearwardly from said windshield.

4. An air current deflector for an open top vehicle having a windshield comprising, a transparent shell forming a relatively air tight sealing attachment to the back of a passenger seat which is pivotally mounted to said vehicle and mounted adjacent said windshield, said shell having a concave inner surface for partially enveloping portions of the head and shoulders of an occupant of said seat and a convex outer surface for deflecting substantially all rapidly moving air currents approaching the head and shoulders of the occupant from the top, side and rear, and said shell being dimensioned so as to remain in position on said seat when said convertible top is up and to permit pivotal movement of said seat.

5. An air current deflector for an open top vehicle having a windshield comprising, a transparent hemispherically shaped shell removably attached to a vehicle and having a concave inner surface for partially enveloping portions of the head and shoulders of an occupant of a seat located adjacent said windshield, said shell defining a forwardly facing opening thereby presenting an unobstructed view to said seated occupant and affording access to said seat, and said shell being positioned adjacent but spaced from said windshield and cooperating therewith and having a convex outer surface for deflecting substantially all rapidly moving air currents approaching the head and shoulders of the occupant from the top, side and rear which are normally deflected by said windshield and re-enter the seating area of said vehicle from behind said occupant.

6. An air current deflector for an open top vehicle having a windshield comprising, a transparent hemispherically shaped shell removably attached and forming a relatively air tight seal with the back of a passenger seat mounted adjacent said windshield, said shell defining a forwardly facing opening thereby presenting an unobstructed view to a seated occupant and affording access to said seat, said shell being positioned adjacent but spaced from said windshield and cooperating therewith and having a concave inner surface for partially enveloping portions of the head and shoulders of said occupant of said seat and having a convex outer surface for deflecting substantially all rapidly moving air currents approaching the head and shoulders of the occupant from the top, side and rear which are normally deflected by said windshield and re-enter the seating area of said vehicle from behind said occupant, said shell having an edge depending below the top of said seat and adapted for gripping the back of said seat.

7. An air current deflector for an open top vehicle having a windshield comprising, a transparent hemispherically shaped shell adapted for forming a relatively air tight sealing attachment to the back of a passenger seat mounted adjacent said windshield, said shell having a concave inner surface for partially enveloping portions of the head and shoulders of an occupant of said seat and having a convex outer surface for deflecting substantially all rapidly moving air currents approaching the head and shoulders of the occupant from the top, side and rear, a member having a length relatively less than the unstressed diameter of said shell and having spaced ends joining opposite edges of said shell so as to stress said shell to prevent deflection at high vehicle speeds.

8. An air current deflector for an open top vehicle having a windshield comprising, a transparent hemispherically shaped shell having a concave inner surface for partially enveloping portions of the head and shoulders of an occupant of a seat positioned adjacent said windshield and having a convex outer surface for deflecting substantially all rapidly moving air currents approaching the head and shoulders of the occupant from the top, side and rear, a member having a length relatively less than the unstressed diameter of said shell so as to stress said shell to prevent deflection at high vehicle speeds, and mounting means connected to said member and adapted for connection to said seat so as to form a relatively air tight seal between said seat and said shell.

9. An air current deflector for an open top vehicle having a windshield comprising, a transparent hemispherically shaped shell having a concave inner surface for partially enveloping portions of the head and shoulders of an occupant of a seat positioned adjacent said windshield and having a convex outer surface for deflecting substantially all rapidly moving air currents approaching the head and shoulders of the occupant from the top, side and rear, said shell having a leading edge extending forwardly of said occupant and a trailing edge adapted for gripping the back of said seat, a member having a length relatively less than the unstressed diameter of said shell and having spaced ends joining opposite edges of said shell so as to stress said shell to prevent deflection at high speeds, and mounting means removably connected to said member and adapted for connection to said seat so as to form a relatively air tight seal between said seat and said shell.

References Cited by the Examiner

UNITED STATES PATENTS

| 1,071,280 | 8/1913 | Van Zile | 296—91 |
| 3,008,761 | 11/1961 | McIlvaine. | |
| 3,112,002 | 11/1963 | Van Der Lely | 180—77 |

FOREIGN PATENTS 1,019,574  11/1957  Germany.

BENJAMIN HERSH, *Primary Examiner.*

A. HARRY LEVY, *Examiner.*